Patented Aug. 18, 1953

2,649,465

UNITED STATES PATENT OFFICE 2,649,465

SULFONATED HYDROARYLAMINO ANTHRAQUINONES

Samuel von Allmen and Hans Eggenberger, Basel, Switzerland, assignors to Sandoz A. G., Basel, Switzerland, a Swiss firm No Drawing. Application April 16, 1951, Serial No. 221,326. In Switzerland July 5, 1946

5 Claims. (Cl. 260—374)

The present invention relates to new dyestuffs of the anthraquinone series which give very brilliant shades and to a process for their manufacture.

It has been found that acid dyestuffs of the anthraquinone series can be prepared by condensing various salts of 1-amino-4-halogen-anthraquinone-2-sulfonic acid with various hydroaromatic amines of the general formula $H_2N-R$, wherein R stands for a 1,2,3,4-tetrahydro-naphthalene or decahydro-naphthalene radical.

The condensation of the anthraquinone compounds with these hydroaromatic amines is carried out at temperatures ranging from 30 to 100° C. preferably in presence of copper and/or a cuprous salt as a catalyst, an acid binding agent such as caustic soda lye, lime and the like, and a diluting agent, and may be carried out in an inert atmosphere. As diluting agent, use may be made of an excess of the hydroaromatic amine itself or water or an organic solvent such as methanol, ethanol or a mixture thereof.

The isolation of the condensation products is carried out by filtration or in other suitable and conventional manner, and presents no special difficulties.

The new dyestuffs obtained according to this process possess, as compared to the known dyestuffs described in U. S. Patent No. 1,821,043, much better levelling properties and can be dyed from a neutral or acetic acid dye bath giving dyeings which are of better fastness properties to washing and milling. They are also superior to the products of the above mentioned U. S. patent with respect to fastness to perspiration. They can not only be used for the dyeing of wool, silk and other animal fibers, but are also well suited for the dyeing of nylon and other nitrogen-containing artificial fibers.

The following examples, without being limitative in the amounts of the ingredients, illustrate the present invention; the parts and percentages being by weight.

Example 1

8.1 parts of the sodium salt of 1-amino-4-bromo-anthraquinone-2-sulfonic acid, 20 parts of 2-amino-decahydro-naphthalene, 4 parts of caustic soda lye (30%), 0.2 part of copper powder, 30 parts of ethanol and 120 parts of water are stirred at 65° C., until the color of the charge has changed to a pure blue. The condensation is carried out in a nitrogen atmosphere. After the reaction is finished, the condensation product is isolated by precipitation by means of hydrochloric or sulfuric acid and by filtration or in other suitable and conventional manner, whereby a blue crystal powder will be obtained. The new dyestuff is soluble in water with a brilliant blue coloration. In concentrated sulphuric acid the pure dyestuff yields nearly colorless solutions, becoming clear greenish-blue on addition of some paraformaldehyde. The new dyestuff dyes animal fibers and nylon in brilliant pure blue shades of good wetting fastness properties. The dyestuff possess the formula

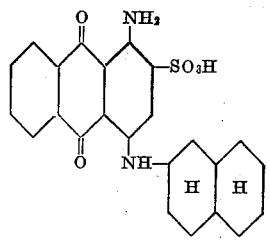

A similar dyestuff will be obtained, when, while otherwise proceeding as described in the preceding paragraph, the 2-amino-decahydro-naphthalene is replaced by an equivalent amount of 1-amino-decahydro-naphthalene, and the formula of the product then is

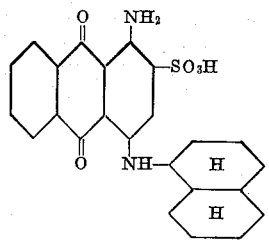

Example 2

7.8 parts of the lithium salt of 1-amino-4-bromo-anthraquinone-2-sulfonic acid, 40 parts of 2 - amino-1,2,3,4-tetrahydro-naphthalene, 4 parts of caustic soda lye (30%), 0.2 part of cuprous chloride, 0.1 part of copper powder and 120 parts of water are stirred at 75° C., until a pure blue coloration is imparted to the charge. After the reaction is finished, the condensation product is isolated as in Example 1. In dry state, it is a blue crystalline powder, which is soluble in water with a brilliant blue coloration. The solution of the pure dyestuff in concentrated sulphuric acid is nearly colorless, but turns to a clear greenish blue on addition of some paraformaldehyde.

The new dyestuff dyes animal fibers and nylon in brilliant pure blue shades of good wet fastness properties and possesses good levelling properties from a neutral, acetic or sulphuric acid dye bath. The condensation can also be carried out in a nitrogen atmosphere and the quantities of the hydroaromatic amine, of the alkali and of the water can be varied. The dyestuff possesses the formula

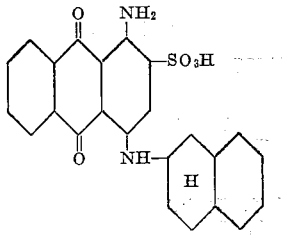

*Example 3*

8.4 parts of the potassium salt of 1-amino-4-bromo-anthraquinone-2-sulfonic acid, 12 parts of 1-amino-1,2,3,4-tetrahydro-naphthalene, 1 part of lime, 0.2 part of copper powder, 30 parts of isopropanol and 120 parts of water are stirred at 80° C., until the charge turns into a pure blue. The condensation product thus obtained is isolated as in Example 1. In dry state it is a blue crystalline powder, which is soluble in water with a brilliant blue shade. Its solution in concentrated sulphuric acid is nearly colorless, but turns to a pure greenish blue on addition of paraformaldehyde.

The new dyestuff dyes wool, silk and nylon in brilliant pure blue shades of good wetting fastness properties. It possesses the formula

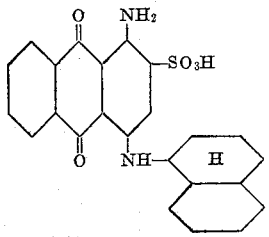

*Example 4*

If, while otherwise proceeding as described in Example 1, the 8.1 parts of the sodium salt of 1-amino-4-bromo-anthraquinone-2-sulfonic acid of the said example are replaced by 7.2 parts of the sodium salt of 1-amino-4-chloro-anthraquinone-2-sulfonic acid, the identical dyestuff will be obtained.

*Example 5*

8.1 parts of the sodium salt of 1-amino-4-bromo-anthraquinone-2-sulfonic acid, 15 parts of 2-amino-1,2,3,4-tetrahydro-naphthalene, 4 parts of caustic soda lye (30%), 0.2 part of copper powder and 120 parts of water are stirred at 65° C., until the charge is colored pure blue. After the reaction is finished, the condensation product is isolated as described in Example 1. In dry state it is a blue crystalline powder which is soluble in water with a brilliant blue coloration. The solution of the pure dyestuff in concentrated sulphuric acid is nearly colorless, but turns to a clear greenish blue on addition of some paraformaldehyde.

The new dyestuff is identical with that of Example 2. The condensation can also be carried out in a nitrogen atmosphere and the quantities of the hydroaromatic amine, of the alkali and of the water can be varied.

*Example 6*

8.1 parts of the sodium salt of 1-amino-4-bromo-anthraquinone-2-sulfonic acid, 12 parts of 1-amino-1,2,3,4-tetrahydro-naphthalene, 4 parts of caustic soda lye (30%), 0.2 part of copper powder, 30 parts of ethanol and 120 parts of water are stirred at 65° C., until the charge turns into a pure blue. The condensation product thus obtained is isolated as previously described. In dry state it is a blue crystalline powder being soluble in cold water with a brilliant blue shade. Its solution in concentrated sulphuric acid is nearly colorless, but turns to a pure greenish blue on addition of paraformaldehyde.

The new dyestuff dyes wool, silk and nylon in brilliant pure blue shades of good wetting fastness properties. It corresponds to the product of Example 3.

This application is in part a continuation of co-pending application Serial No. 759,242, filed July 5, 1947 (which application has become abandoned since the filing of the present application).

Having thus disclosed the invention, what is claimed is:

1. An acid anthraquinone dyestuff which corresponds to the formula

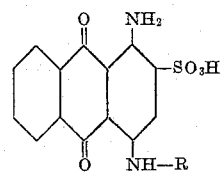

wherein R stands for a radical selected from the group consisting of

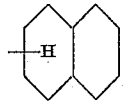

and

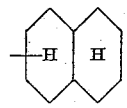

2. The anthraquinone dyestuff of the formula

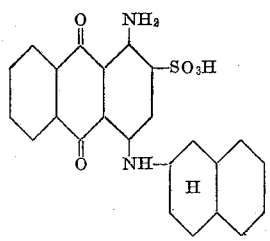

3. The anthraquinone dyestuff of the formula

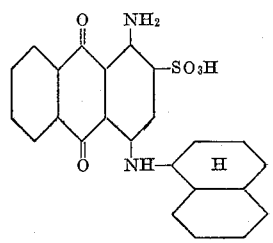

4. The anthraquinone dyestuff of the formula
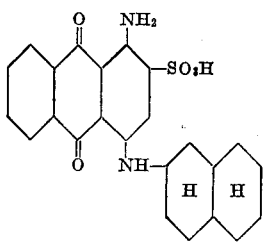
5. The anthraquinone dyestuff of the formula
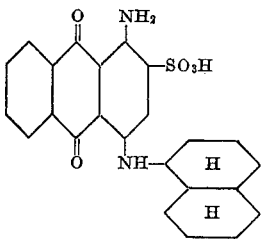
SAMUEL VON ALLMEN.
HANS EGGENBERGER.
References Cited in the file of this patent
UNITED STATES PATENTS
| Number | Name | Date |
|---|---|---|
| 1,821,043 | Weinand | Sept. 1, 1931 |
| 2,042,757 | Zahn | June 2, 1936 |
FOREIGN PATENTS
| Number | Country | Date |
|---|---|---|
| 713,356 | France | Oct. 27, 1931 |